(12) United States Patent
Li et al.

(10) Patent No.: US 9,568,766 B2
(45) Date of Patent: Feb. 14, 2017

(54) LIGHTING SYSTEM, LIGHTING DEVICE AND RECEIVING DEVICE

(71) Applicant: BOE Technology Group Co., Ltd., Beijing (CN)

(72) Inventors: Wenbo Li, Beijing (CN); Yefei Dong, Beijing (CN)

(73) Assignee: Boe Technology Group Co., Ltd., Beijing (CN)

( * ) Notice: Subject to any disclaimer, the term of this patent is extended or adjusted under 35 U.S.C. 154(b) by 0 days.

(21) Appl. No.: 14/500,531

(22) Filed: Sep. 29, 2014

(65) Prior Publication Data

US 2015/0370127 A1    Dec. 24, 2015

(30) Foreign Application Priority Data

Jun. 19, 2014  (CN) .......................... 2014 1 0276936

(51) Int. Cl.
G02F 1/1335 (2006.01)
G02F 1/1333 (2006.01)
G06F 21/84 (2013.01)

(52) U.S. Cl.
CPC ..... *G02F 1/133528* (2013.01); *G02F 1/13362* (2013.01); *G06F 21/84* (2013.01); *G02F 2001/13356* (2013.01)

(58) Field of Classification Search
CPC .......................... G02F 1/133526; G02F 1/336
See application file for complete search history.

(56) References Cited

U.S. PATENT DOCUMENTS 4,021,846 A * 5/1977 Roese ................ H04N 13/0438
348/335

6,280,054 B1 * 8/2001 Cassarly ............ G02B 27/0172
361/240

(Continued)

FOREIGN PATENT DOCUMENTS

CN        103064211         4/2013
CN        103713419         4/2014

(Continued)

OTHER PUBLICATIONS

Zhou Chaodan, Chinese Patent Application Publication 103728767, Apr. 2014, machine translation.*

(Continued)

*Primary Examiner* — Tracie Y Green
(74) *Attorney, Agent, or Firm* — Calfee, Halter & Griswold LLP

(57) ABSTRACT

The general inventive concepts provide a lighting system, a light device and a receiving device. The lighting device applies a liquid crystal display panel as a luminaire, the liquid crystal display panel has a first polarizer only on a light input side. The receiving device comprises a second polarizer and a magnifying component. The second polarizer is used for polarization-analyzing an emitted light, which is emitted from the liquid crystal display panel and carries confidential information. Light passes through the first polarizer and becomes linearly polarized light, which linearly polarized light is emitted after passing through the liquid crystal display panel. The confidential information carried therein cannot be identified by the naked eye. Therefore, the human eye regards it as white light, the lighting device can thus be used as a lighting luminaire. However, when watching the lighting device through the receiving device, the confidential information displayed by the liquid crystal display panel can be seen clearly.

7 Claims, 4 Drawing Sheets

(56) References Cited

U.S. PATENT DOCUMENTS

| | | | | |
|---|---|---|---|---|
| 7,554,623 B2* | 6/2009 | Slobodin | ........... | G02F 1/133621 |
| | | | | 349/57 |
| 7,847,868 B2* | 12/2010 | Slobodin | ........... | G02F 1/133621 |
| | | | | 349/106 |
| 2002/0027779 A1* | 3/2002 | Cassarly | ............ | G02B 27/0172 |
| | | | | 362/231 |
| 2011/0211135 A1* | 9/2011 | Sharp | .................. | G02B 27/2264 |
| | | | | 349/15 |
| 2011/0279749 A1* | 11/2011 | Erinjippurath | ....... | G09G 3/3426 |
| | | | | 349/61 |
| 2013/0335682 A1* | 12/2013 | Gilbert | ................... | G09G 3/003 |
| | | | | 349/85 |

FOREIGN PATENT DOCUMENTS

| | | |
|---|---|---|
| CN | 103728767 | 4/2014 |
| CN | 103838028 | 6/2014 |
| JP | 2001222004 | 8/2001 |
| JP | 2004347657 | 12/2004 |
| KR | 20110007287 | 1/2011 |

OTHER PUBLICATIONS

Office action from Chinese Application No. 201410276936.7 dated May 23, 2016.
Office Action from China Application No. 201410276936.7 dated Oct. 19, 2016.

* cited by examiner

LIGHTING SYSTEM, LIGHTING DEVICE AND RECEIVING DEVICE

RELATED APPLICATIONS

The present application claims the benefit of Chinese Patent Application No. 201410276936.7, filed Jun. 19, 2014, the entire disclosure of which is incorporated herein by reference.

FIELD

The general inventive concepts relate to the field of lighting, and in particular, relate to a lighting system, a lighting device and a receiving device.

BACKGROUND

In general, lighting luminaires are necessary in modern society. For example, the city square, traffic roads, community, home, shopping mall and office building, all need lighting luminaires for lighting or decoration. Due to the abundance of choices of light sources, the evolution of lighting luminaires provides an opportunity for improvement. The emergence of new light sources (such as fluorescent lamps, energy-saving lamps, LED, etc.) plays an important role in the development of lighting luminaires, which cannot be ignored.

Conventionally speaking, lighting luminaires are mainly used for lighting; this limits the development of more functions for the lighting luminaires. Therefore, it is necessary to develop the function of lighting luminaires more extensively, which makes them have a wider application field, thereby making full use of the lighting luminaires.

SUMMARY

An object of the present invention is to provide a lighting system, a lighting device and a receiving device, such that the lighting device can have a specific display function while lighting, thereby improving the utility value of the lighting device.

This can be achieved according to the exemplary embodiments, wherein:

an embodiment of the present invention provides a lighting system, wherein the lighting system comprises a light device and a receiving device;

the lighting device comprises a liquid crystal display panel; a first polarizer is provided on a light input side of the liquid crystal display panel; the liquid crystal display panel is used for displaying confidential information;

the receiving device comprises a second polarizer and a magnifying component, wherein the polarization direction of the second polarizer is substantially perpendicular to the polarization direction of the first polarizer; the second polarizer is used for polarization-analyzing an emitted light, which is emitted from the liquid crystal display panel and carries the confidential information; the magnifying component is used for magnifying displaying the confidential information.

In certain embodiments, the lighting device further comprises a support, on which the liquid crystal display panel is fixed.

In certain embodiments, the liquid crystal display panel comprises: a backlight module for providing light; a liquid crystal cell comprising an array substrate and a counter substrate arranged opposite to one another, and a liquid crystal layer provided in the liquid crystal cell; wherein the first polarizer is provided between the backlight module and the liquid crystal cell, the light provided by the backlight module is emitted after passing through the first polarizer and the liquid crystal cell in turn.

In certain embodiments, the emitted light is a white light during displaying of the liquid crystal cell.

In certain embodiments, the magnifying component is a concave lens with a specified magnification.

In certain embodiments, the magnifying component is a liquid crystal lens.

The lighting device in the lighting system of the exemplary embodiments applies a liquid crystal display panel as a luminaire, and the liquid crystal display panel is arranged to have a first polarizer only on a light input side (that is, there is no second polarizer provided on the light output side of the liquid crystal display panel). With such a configuration, during the operation of the liquid crystal display panel, the light from the backlight module passes through the first polarizer and becomes linearly polarized light. After passing through the liquid crystal display panel. Since the linearly polarized light is not polarization-analyzed by a second polarizer, the confidential information carried therein cannot be identified by the naked eye. Therefore, the human eye regards it as a white light (i.e., a white image), and the confidential information is thus not recognized, allowing the lighting device to be used as a lighting luminaire. On the other hand, when watching the lighting device through the receiving device with a second polarizer (the receiving device being arranged at a distance from the lighting device), the confidential information displayed by the liquid crystal display panel can be seen clearly due to the filtering function of the second polarizer and the magnifying displaying function of the magnifying component for the confidential information.

In certain embodiments the lighting device comprises a liquid crystal display panel; a first polarizer is provided only on a light input side of the liquid crystal display panel; and the liquid crystal display panel is used for displaying confidential information (e.g., a message or the like).

In certain embodiments, the lighting device further comprises a support, on which the liquid crystal display panel is fixed.

In certain embodiments, the liquid crystal display panel comprises: a backlight module for providing light; a liquid crystal cell formed by arranging oppositely an array substrate and a counter substrate, and a liquid crystal layer provided in the liquid crystal cell; wherein the first polarizer is provided between the backlight module and the liquid crystal cell, the light provided by the backlight module is emitted after passing through the first polarizer and the liquid crystal cell in turn.

In certain embodiments, the emitted light is a white light during displaying of the liquid crystal cell.

The lighting device provided by the exemplary embodiments applies a liquid crystal display panel as a luminaire, and the liquid crystal display panel is arranged to have a first polarizer only on a light input side (that is, there is no second polarizer provided on the light output side of the liquid crystal display panel). With such a configuration, during the operation of the liquid crystal display panel, the light from the backlight module passes through the first polarizer and becomes linearly polarized light. After passing through the liquid crystal display panel. Because the linearly polarized light is not polarization-analyzed by a second polarizer, the confidential information carried therein cannot be identified by the naked eye. Therefore, the human eye regards it as a white light (i.e., a white image), the lighting device can thus be used as a lighting luminaire even while "displaying" a confidential message to those viewing it through a receiving device. In other words, the lighting system provided above, with a receiving device cooperating with the lighting device, the confidential information displayed by the liquid crystal display panel can be seen clearly at a distance from the lighting device, due to the filtering function of the second polarizer and the magnifying displaying function of the magnifying component.

Certain embodiments provide a receiving device, wherein the receiving device comprises a second polarizer and a magnifying component. The polarization direction of the second polarizer is substantially perpendicular to the polarization direction of the first polarizer in the lighting device described above. The second polarizer is used for polarization-analyzing an emitted light, which is emitted from the liquid crystal display panel and carries the confidential information; the magnifying component is used for magnifying displaying the confidential information.

In certain embodiments, the magnifying component is a concave lens with a specified magnification. In certain embodiments, the magnifying component is a liquid crystal lens.

The lighting device in the lighting applies a liquid crystal display panel as a luminaire, and the liquid crystal display panel is arranged to have a first polarizer only on a light input side (that is, there is no second polarizer provided on the light output side of the liquid crystal display panel). With such a configuration, during the operation of the liquid crystal display panel, the light from the backlight module passes through the first polarizer and becomes linearly polarized light. After passing through the liquid crystal display panel, since the linearly polarized light is not polarization-analyzed by a second polarizer, the confidential information carried therein can not be indentified in a state of naked eye; therefore, the human eye regards it as a white light (i.e., a white image), the lighting device can thus be used as a lighting luminaire. When watching the lighting device through the receiving device with a second polarizer and a magnifying component (the receiving device being arranged at a distance from the lighting device), the confidential information displayed by the liquid crystal display panel can be seen clearly with human eye due to the filtering function of the second polarizer and the magnifying displaying function of the magnifying component for the confidential information.

BRIEF DESCRIPTION OF THE DRAWINGS

Several technical aspects of the present disclosure will be described in more detail below with reference to the accompanying drawings in order for those skilled in the art to be able to carry out the embodiments of present disclosure. The present disclosure may, however, be embodied in many different forms and should not be construed as limited to the exemplary embodiments set forth herein. In particular, the general inventive concepts are not intended to be limited by the various illustrative embodiments disclosed herein.

DETAILED DESCRIPTION

Various embodiments will be further described in detail in conjunction with the drawings. The embodiments described herein are provided merely for illustration and are not intended to limit the scope of the claims. Those of skill in the art will recognize that various other modifications and combinations are possible and still fall within the scope of the general inventive concepts.

Figure 1:
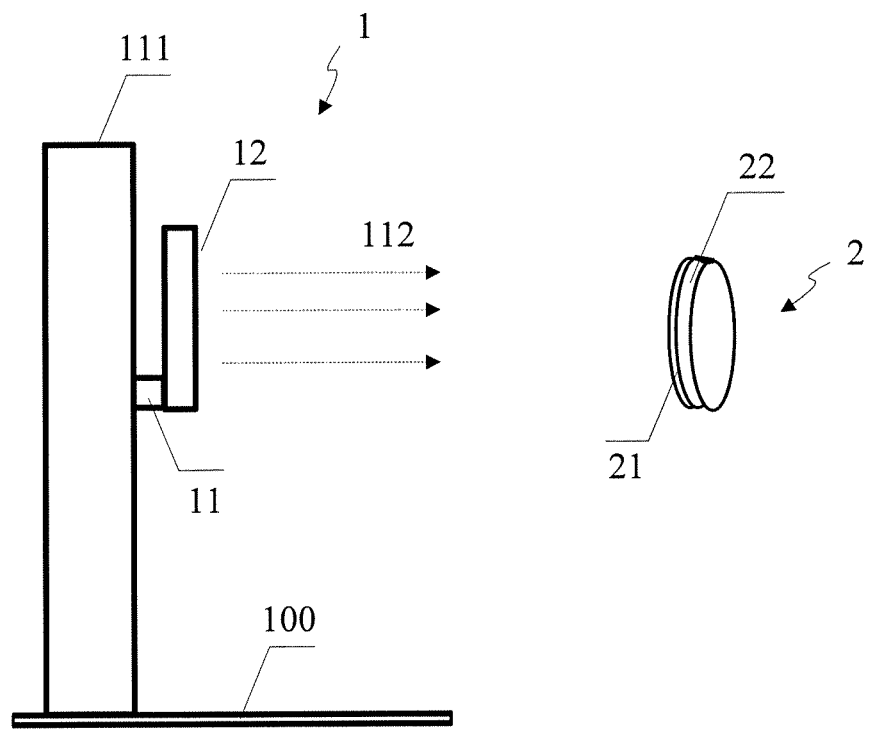
FIG. 1 is a structural schematic diagram of a lighting system provided by an exemplary embodiment.
Figure 2:
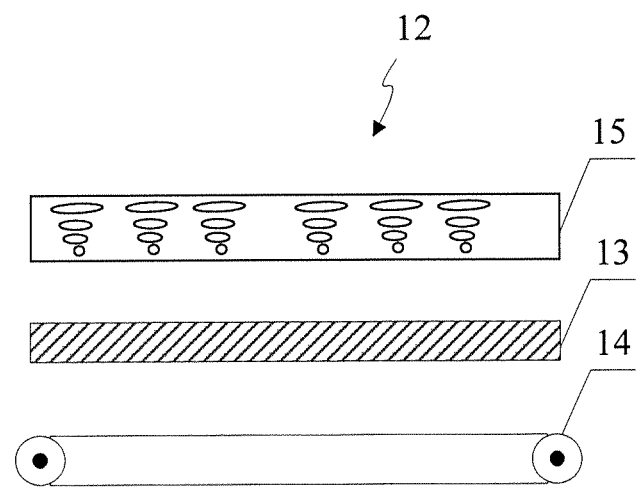
FIG. 2 is a structural schematic diagram of the liquid crystal display panel of a lighting device provided by an exemplary embodiment.

Referring to FIG. 1, an exemplary embodiment provides a lighting system, wherein the lighting system comprises a light device 1 and a receiving device 2. The lighting device 1 comprises a liquid crystal display panel 12. As shown in FIG. 2, a first polarizer 13 is provided only on a light input side of the liquid crystal display panel 12. The liquid crystal display panel 12 is used for displaying a confidential information. The receiving device 2 comprises a second polarizer 21 and a magnifying component 22, wherein the polarization direction of the second polarizer 21 is substantially perpendicular to the polarization direction of the first polarizer 13. The light emitted from the liquid crystal display panel 12 of the lighting device 1 can be used for lighting. In addition, the liquid crystal display panel 12 is used for displaying confidential information. The second polarizer 21 of the receiving device 2 is used for polarization-analyzing (e.g., correction, repolarization etc.) an emitted light 112, which is emitted from the liquid crystal display panel 12 and carries the confidential information. Moreover, the emitted light 112 is transmitted after polarization by the first polarizer 13; after being polarization-analyzed by the second polarizer 21, the confidential information carried in the emitted light 112 can be identified with the receiving device 2; the magnifying component 22 can be used for magnifying and displaying the confidential information.

The lighting device 1 can further comprise a support 11. In an embodiment, for example, the lighting device can be a wall lamp. In the implementation, as shown in FIG. 1, the liquid crystal display panel 12 can be fixed onto the wall 111 with the support 11 in the lighting device, wherein the wall is substantially perpendicular to the ground 100. The lighting device 1 provided by the embodiments can also be used as lighting luminaires such as a ceiling or other lamp. The second polarizer 21 of the receiving device 2 is used for polarization-analyzing the emitted light 112 of the lighting device 1, thus the information displayed by the liquid crystal display panel 12 of the lighting device 1 can be obtained. The obtained information displayed by the liquid crystal display panel 12 can be magnified with the magnifying component 22. The confidential information displayed on the lighting device 1 can be identified clearly within a certain distance with the receiving device 2.

Referring to FIG. 2, the liquid crystal display panel 12 can comprise: a backlight module 14 for providing light; a liquid crystal cell 15 formed by arranging an array substrate and a counter substrate opposite to one another, and a liquid crystal layer provided in the liquid crystal cell 15. The first polarizer 13 is provided between the backlight module 14 and the liquid crystal cell 15, the light provided by the backlight module 14 is emitted after passing through the first polarizer 13 and the liquid crystal cell 15 in turn.

Figure 5:
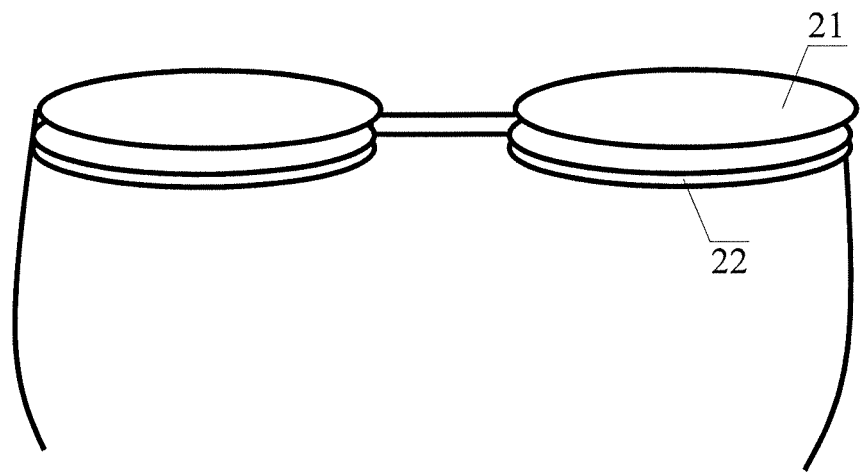
FIG. 5 is a structural schematic diagram of the glasses provided by an exemplary embodiment.
Figure 6:
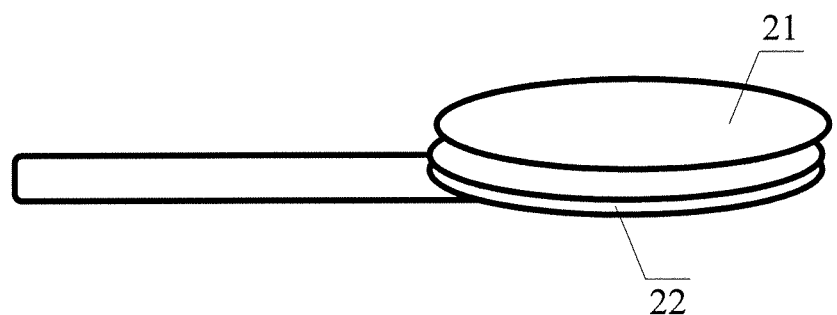
FIG. 6 is a structural schematic diagram of the magnifying lens provided by an exemplary embodiment.

The magnifying component 22 of the receiving device 2 can be a concave lens with a specified magnification, or a liquid crystal lens. In addition, in different application scenarios, the receiving device 2 can be designed as the glasses as shown in FIG. 5, with the second polarizer 21 and the magnifying component 22 being provided on, for example, the lenses of glasses. Alternatively, the receiving device 2 can be designed as the magnifying lens as shown in FIG. 6, wherein, the magnifying lens also comprises the second polarizer 21 and the magnifying component 22. These embodiments are only used for illustrating the applications of the receiving device 2, and are not meant as a limitation of the general inventive concepts.

Figure 3:
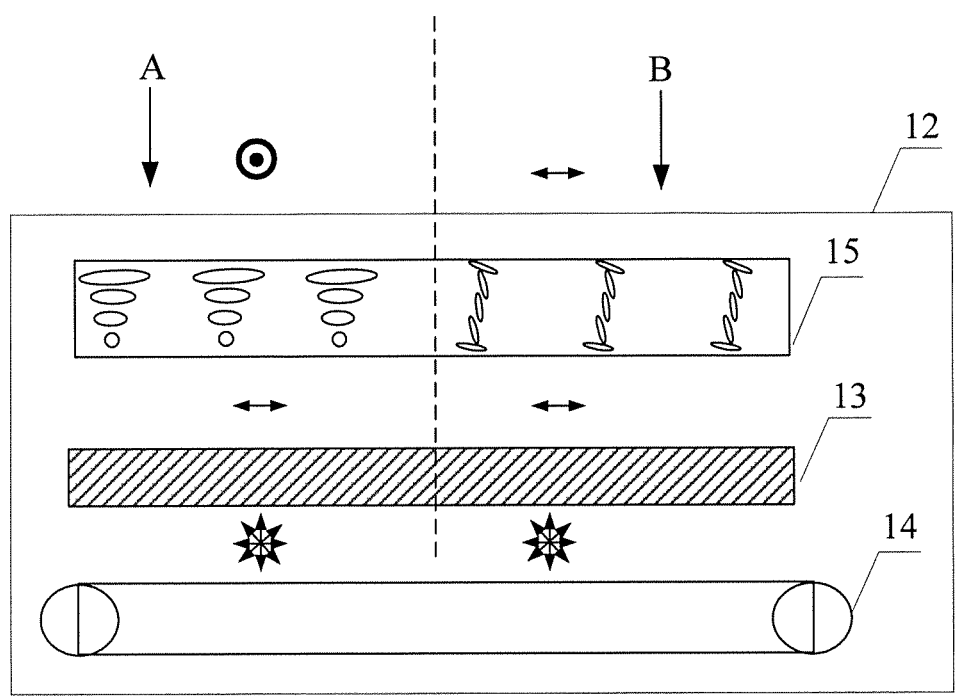
FIG. 3 is a principle diagram of the liquid crystal display panel in a lighting device provided by an exemplary embodiment, which lighting device is observed directly with human eye.

Referring to FIG. 3, in the liquid crystal display panel 12 of the embodiment shown in FIG. 2, the region A and the region B are in a bright state and a dark state respectively. The liquid crystal display panel 12 has a first polarizer 13 only. The light is polarized by the first polarizer 13, and the linearly polarized light is emitted after passing through the liquid crystal cell 15. Since the light emitted from the liquid crystal cell 15 is not polarization-analyzed, the confidential information carried therein cannot be indentified by the naked eye. Therefore, the human eye will perceive it as white light, the lighting system can thus be regarded as a lighting luminaire.

When using the receiving device 2 shown in FIG. 1 to observe the liquid crystal display panel 12, since the emitted light 112 from the liquid crystal cell 15 can be polarization-analyzed by the second polarizer in the receiving device 2, the confidential information carried in the emitted light 112 can then be observed. It should be noted that, the lighting device 1 is typically small, and the magnifying component 22 can be used for magnifying and displaying the confidential information, which is shown after being polarization-analyzed. Therefore, the confidential information displayed by the lighting device 1 can be observed clearly with the receiving device 2.

In operation, the lighting device 1 in the lighting system provided by the embodiments of the present invention can be used in a hall, a reception room, or an exhibition hall. For normal participants or visitors, the lighting device merely provides lighting; even if these persons wear sun glasses and 3D glasses with polarization functions. The displayed information cannot be seen clearly without being magnified, since the area of the lighting device is very small. However, the staff can wear the receiving device 2 with the second polarizer 21 and the magnifying component 22 (wherein the receiving device 2 can be the glasses shown in FIG. 5, or the magnifying lens shown in FIG. 6); or, the staff can see the information displayed on the lighting device 1 clearly through a receiving device, which is fixed and has a certain distance from the lighting device 1, wherein the information can be a notice, a customer information, or other confidential information.

The advantageous effect of the embodiments of the present invention is: the lighting device in the lighting system applies a liquid crystal display panel as a luminaire, and the liquid crystal display panel is arranged to have a first polarizer only on a light input side (that is, there is no second polarizer provided on the light output side of the liquid crystal display panel). With such a configuration, during the operation of the liquid crystal display panel, the light from the backlight module passes through the first polarizer and becomes linearly polarized light. After passing through the liquid crystal display panel, since the linearly polarized light is not polarization-analyzed by a second polarizer, the confidential information carried therein cannot be identified by the naked eye. Therefore, the human eye regards it as a white light (or, a white image), the lighting device can thus be used as a lighting luminaire. When watching the lighting device through the receiving device with a second polarizer (the receiving device being arranged at a distance from the lighting device), the confidential information displayed by the liquid crystal display panel can be seen clearly. The filtering function of the second polarizer and the magnifying displaying function of the magnifying component for the confidential information, allowing the otherwise "invisible" information to be seen.

Referring to FIG. 1, the lighting device 1, comprises a liquid crystal display panel 12; the liquid crystal display panel is used for displaying a confidential information. A first polarizer 13 is provided only on a light input side of the liquid crystal display panel 12, as shown in FIG. 2.

In certain embodiments, the lighting device 1 further comprises a support 11, on which the liquid crystal display panel 12 is fixed.

As shown in FIG. 2, the liquid crystal display panel can comprise: a backlight module 14 for providing light; a liquid crystal cell 15 formed by arranging an array substrate and a counter substrate opposite to one another, and a liquid crystal layer provided in the liquid crystal cell 15; wherein the first polarizer 13 is provided between the backlight module 14 and the liquid crystal cell 15, the light provided by the backlight module 14 is emitted after passing through the first polarizer 13 and the liquid crystal cell 15 in turn.

In certain embodiments, the emitted light is a white light during displaying of the liquid crystal cell 15.

The lighting device applies a liquid crystal display panel as a luminaire, and the liquid crystal display panel is arranged to have a first polarizer only on a light input side (that is, there is no second polarizer provided on the light output side of the liquid crystal display panel). With such a configuration, during the operation of the liquid crystal display panel, the light from the backlight module passes through the first polarizer and becomes linearly polarized light. After passing through the liquid crystal display panel, since the linearly polarized light is not polarization-analyzed by a second polarizer, the confidential information carried therein cannot be identified by the naked eye. Therefore, the human eye regards it as a white light (i.e., a white image). The lighting device can thus be used as a lighting luminaire. In the lighting system provided above, with a receiving device cooperating with the lighting device, the confidential information displayed by the liquid crystal display panel can be seen clearly at a distance from the lighting device.

Referring to the structural schematic diagram of the receiving device in FIG. 1, a receiving device 2, which can be used cooperatively with the lighting device 1, is shown. The receiving device 2 comprises a second polarizer 21 and a magnifying component 22, wherein the polarization direction of the second polarizer 21 is substantially perpendicular to the polarization direction of the first polarizer 13. The second polarizer 21 is used for polarization-analyzing an emitted light 112 (shown in FIG. 1), which is emitted from the liquid crystal display panel 12 of the lighting device 1 (shown in FIG. 1) and carries the confidential information. The magnifying component 22 is used for magnifying and displaying the confidential information.

In certain embodiments, the magnifying component 22 is a concave lens with a specified magnification.

In certain embodiments, the magnifying component 22 is a liquid crystal lens.

The lighting device utilizes a liquid crystal display panel as a luminaire, and the liquid crystal display panel is arranged to have a first polarizer only on a light input side (that is, there is no second polarizer provided on the light output side of the liquid crystal display panel). With such a configuration, during the operation of the liquid crystal display panel, the light from the backlight module passes through the first polarizer and becomes linearly polarized light. After passing through the liquid crystal display panel, since the linearly polarized light is not polarization-analyzed by a second polarizer, the confidential information carried therein can not be identified by the naked eye. Therefore, the human eye regards it as a white light (i.e., a white image), and the lighting device can thus be used as a lighting luminaire. When watching the lighting device through the receiving device with a second polarizer and a magnifying component (the receiving device being arranged at a distance from the lighting device), the confidential information displayed by the liquid crystal display panel can be seen clearly by the human eye.

The advantageous effects of the exemplary embodiments are: the receiving device is used cooperatively with the information displayed by the lighting device, which lighting device has dual function of lighting and displaying. On the base of lighting, the lighting device can display information, which cannot be identified directly with the unaided eye. The receiving device can be used for identifying the information upon user's requirement. Thereby the lighting device can have dual function of lighting and displaying simultaneously, while preventing unwanted observation of the confidential information. The arrangement can be applied in such a scenario, in which the information should be displayed covertly, thereby improving the utility value of the lighting device.

Figure 4:
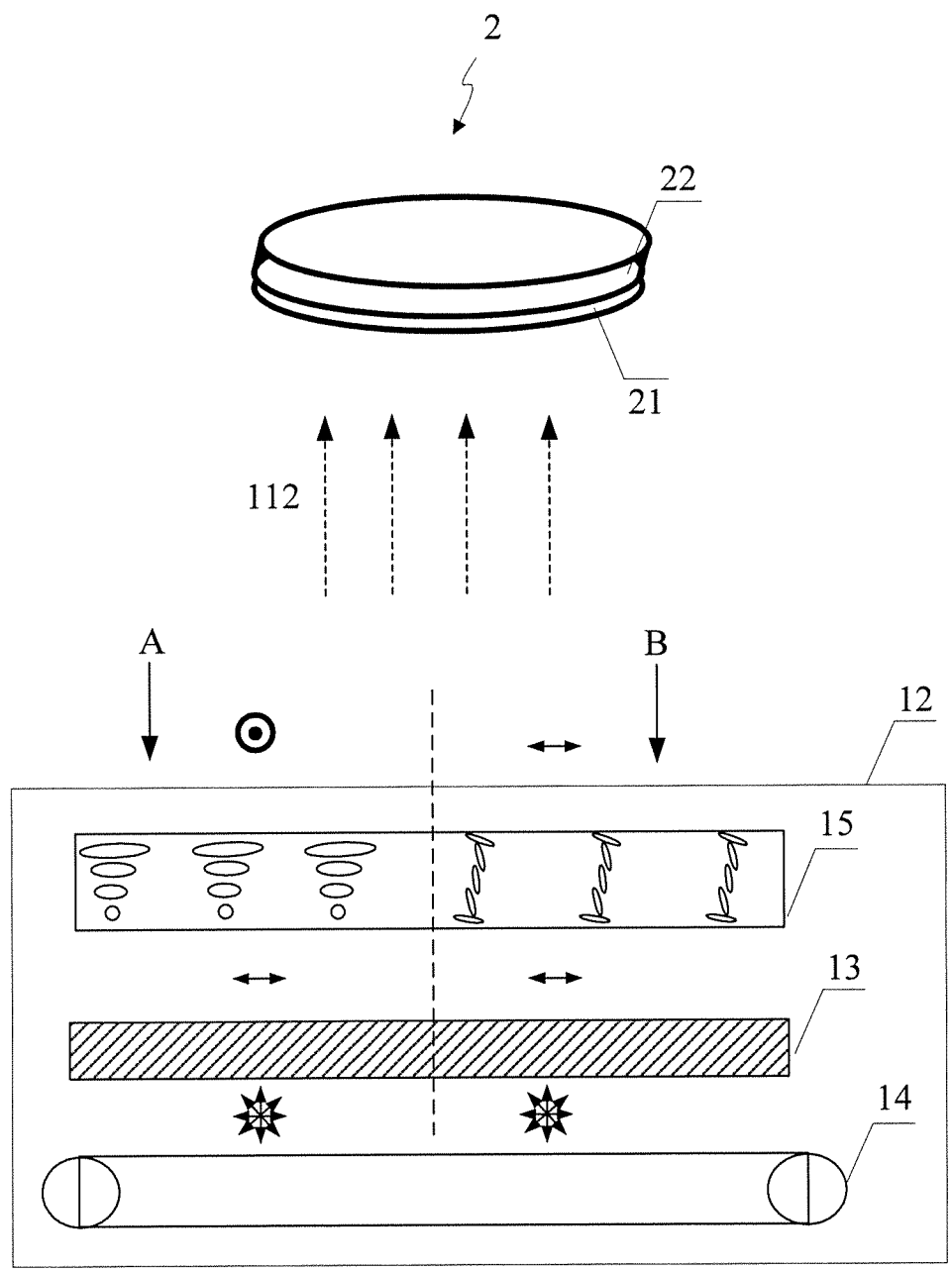
FIG. 4 is a principle diagram of the liquid crystal display panel in the lighting device provided by an embodiment of the present invention, which lighting device is observed with a receiving device.

FIG. 3 is a principle diagram of the liquid crystal display panel in the lighting device according to an exemplary embodiment. A human eye, observing from the side of the liquid crystal cell 15, in the liquid crystal display panel 12; the backlight module 14 emits white light during lighting or displaying; and light is emitted from the liquid crystal cell 15 after being polarized by the first polarizer 13. The liquid crystal cell 15 achieves the display of the confidential information according to the light provided by the backlight module 14 and the deflecting of the liquid crystal. However, since the emitted light from the lighting device 1 is a white light without being polarization-analyzed, human eye cannot perceive the confidential information displayed on the liquid crystal display panel 12. In contrast to FIG. 3, FIG. 4 is a principle diagram of observing the confidential information with a receiving device. The emitted light 112 from the liquid crystal display panel 12 is polarization-analyzed by the second polarizer 21 of the receiving device 2. In this manner, the information displayed on the liquid crystal cell 15 can be read through the receiving device 2, while the magnifying component 22 is used for magnifies and displays the information.

To make the receiving device 2 more conducive for applications, the receiving device 2 can be manufactured to resemble an ordinary pair of glasses or magnifying lens. For example, the glasses comprising a second polarizer 21 and a magnifying component 22, shown in FIG. 5; or the magnifying lens comprising a second polarizer 21 and a magnifying component 22 as well, shown in FIG. 6. The receiving device 2 can also be manufactured with other shape, which is not necessarily limited here.

The exemplary embodiments provide a lighting system, a lighting device and a receiving device. The lighting device applies a liquid crystal display panel as a luminaire, and the liquid crystal display panel is arranged to have a first polarizer only on a light input side (that is, there is no second polarizer provided on the light output side of the liquid crystal display panel). With such a configuration, during the operation of the liquid crystal display panel, the light from the backlight module passes through the first polarizer and becomes linearly polarized light. After passing through the liquid crystal display panel, since the linearly polarized light is not polarization-analyzed by a second polarizer, the confidential information carried therein cannot be identified in by the unaided eye. Therefore, the human eye regards it as a white light (i.e., a white image), the lighting device can thus be used as a lighting luminaire, even while "displaying" information that would otherwise be held secret. In the lighting system provided above, with a receiving device cooperating with the lighting device, the confidential information displayed by the liquid crystal display panel can be seen clearly. The lighting device and the receiving device can constitute the lighting system, thereby a specific display function of the lighting device and an effective utilization thereof can be achieved, making full use of the lighting luminaires.

Although the present disclosure has been described with reference to specific embodiments, it should be understood that the limitations of the described embodiments are provided merely for purpose of illustration and are not intended to limit the present invention and associated general inventive concepts. Instead, the scope of the present invention is defined by the appended claims, and all variations and equivalents that fall within the range of the claims are intended to be embraced therein. Thus, other embodiments than the specific exemplary ones described herein are equally possible within the scope of these appended claims.

What is claimed is:

1. A lighting system, comprising a lighting device and a receiving device separate from the lighting device;
    the lighting device comprises a liquid crystal display panel; a first polarizer, wherein a polarizer is provided only on a light input side of the liquid crystal display panel; the liquid crystal display panel emits light and is used for displaying confidential information;
    the receiving device comprises a second polarizer for polarization-analyzing the emitted light from the lighting device at a distance from the lighting device and a magnifying component, wherein the polarization direction of the second polarizer is substantially perpendicular to the polarization direction of the first polarizer; the second polarizer is capable of polarization-analyzing the light which is emitted from the liquid crystal display panel and carries the confidential information; the magnifying component magnifies and displays the confidential information; and the magnifying component is a liquid crystal lens.

2. The lighting system according to claim 1, wherein the lighting device further comprises a support, on which the liquid crystal display panel is fixed.

3. The lighting system according to claim 1, wherein the liquid crystal display panel comprises: a backlight module for providing light;
    a liquid crystal cell formed by arranging an array substrate and a counter substrate opposite to one another, and a liquid crystal layer provided in the liquid crystal cell;
    wherein the first polarizer is provided between the backlight module and the liquid crystal cell, the light provided by the backlight module is emitted after passing through the first polarizer and the liquid crystal cell in turn.

4. The lighting system according to claim 3, wherein the emitted light is a white light during operation of the liquid crystal cell.

5. The lighting system according to claim 1, wherein the magnifying component comprises a concave lens with a specified magnification.

6. A receiving device comprising: only one polarizer and a magnifying component, wherein the polarization direction of the polarizer is substantially perpendicular to the polarization direction of the first polarizer in a lighting device,
- wherein the lighting device comprises a liquid crystal display panel; a first polarizer, wherein the first polarizer is provided only on a light input side of the liquid crystal display panel; wherein there is no polarizer on a light output side of the liquid crystal display panel; wherein the liquid crystal display panel is used for displaying a confidential information;
- the polarizer polarization-analyzes an emitted light, which is emitted from the liquid crystal display panel and carries the confidential information; the magnifying component magnifies and displays the confidential information; and the magnifying component is a liquid crystal lens.

7. The receiving device according to claim 6, wherein the magnifying component comprises a concave lens with a specified magnification.

* * * * *